No. 733,510. PATENTED JULY 14, 1903.
C. REDD & G. H. CORMACK.
FLAP FOLDER FOR CARTON CLOSING MACHINES.
APPLICATION FILED JULY 1, 1902.
NO MODEL. 6 SHEETS—SHEET 5.
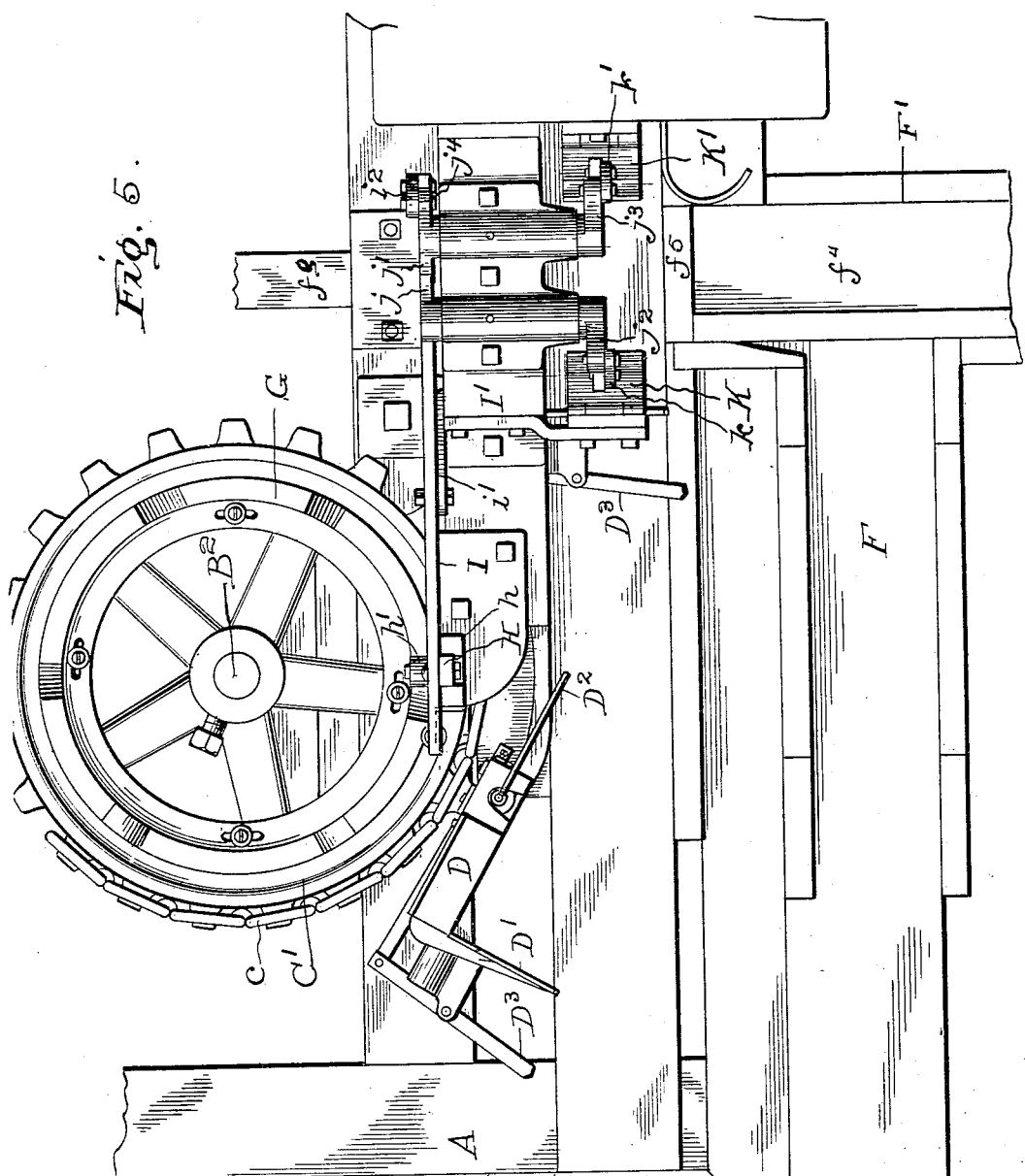
Witnesses:
Chas. O. Shervey
S. Bliss.
Inventors
Charlie Redd
George H. Cormack
by H. Betner
Atty.
THE NORRIS PETERS CO., PHOTO-LITHO., WASHINGTON, D. C.

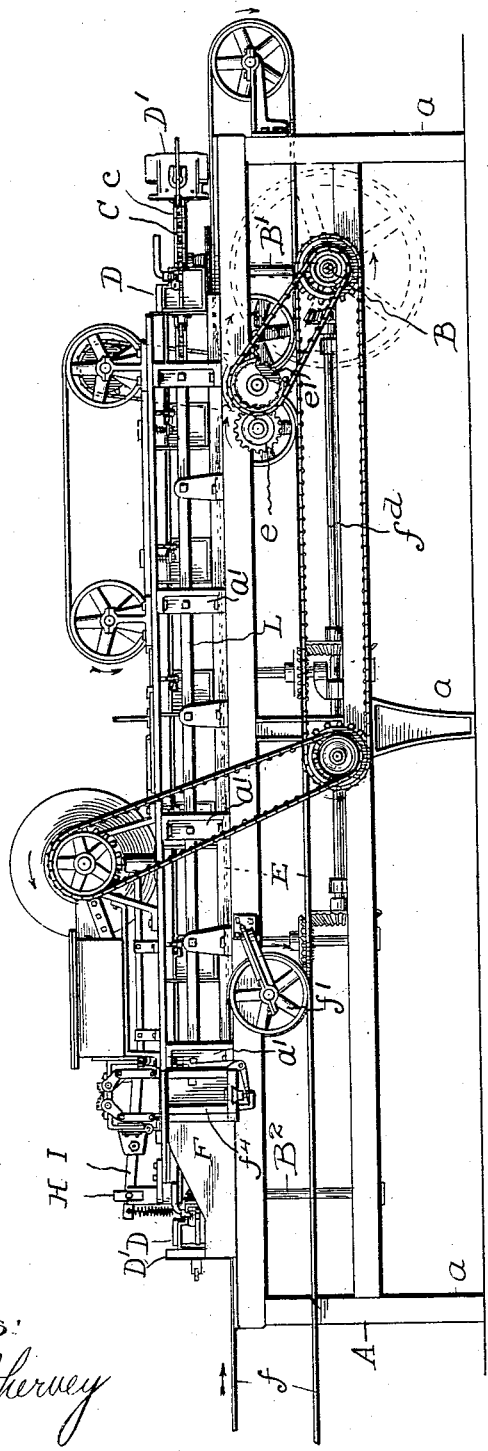

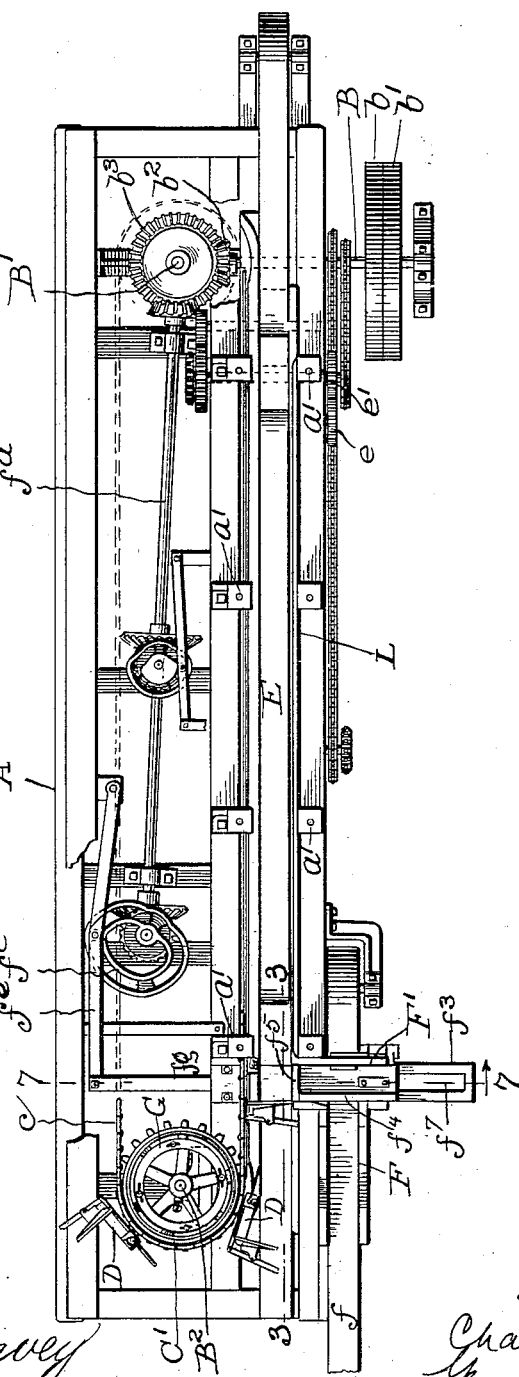

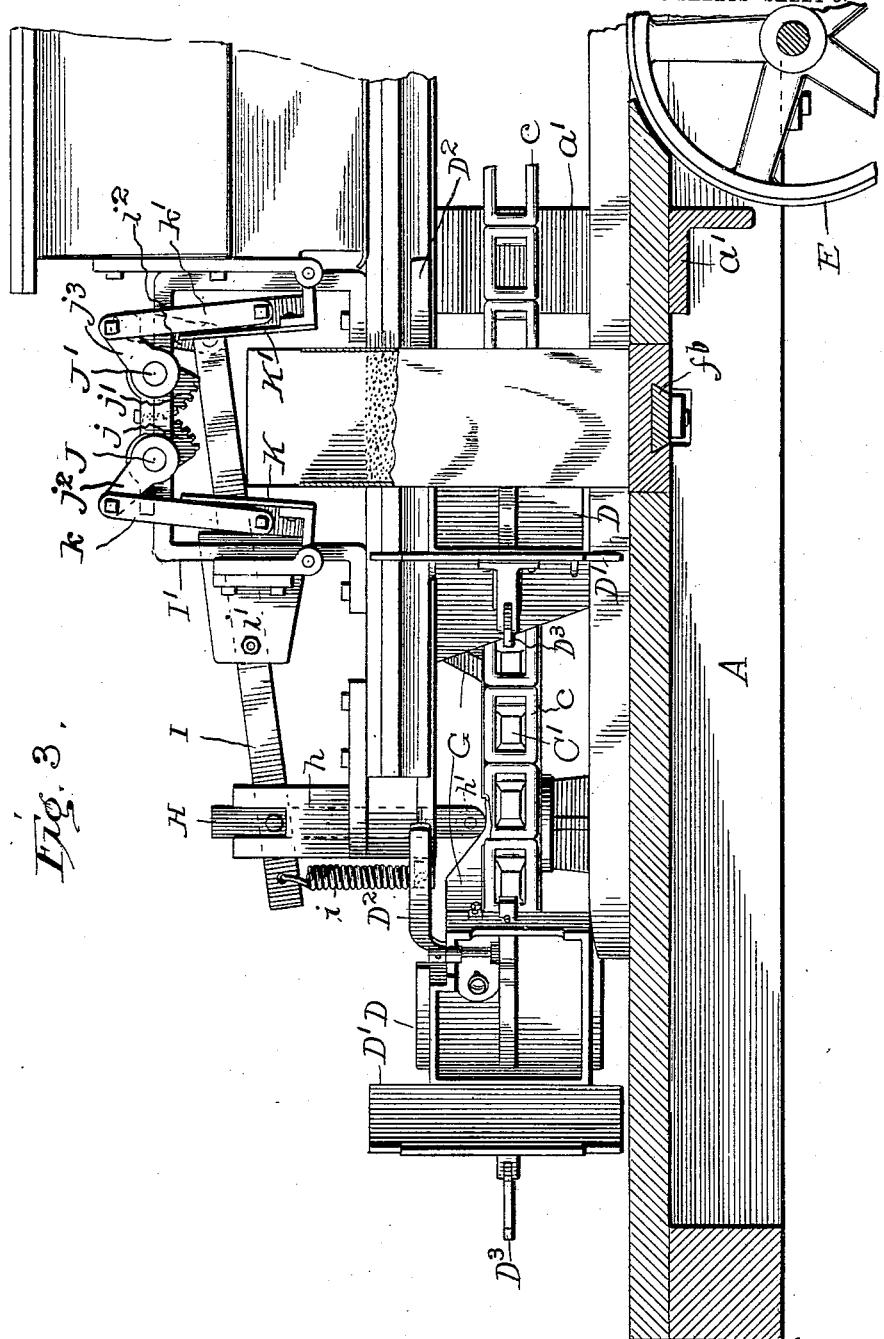

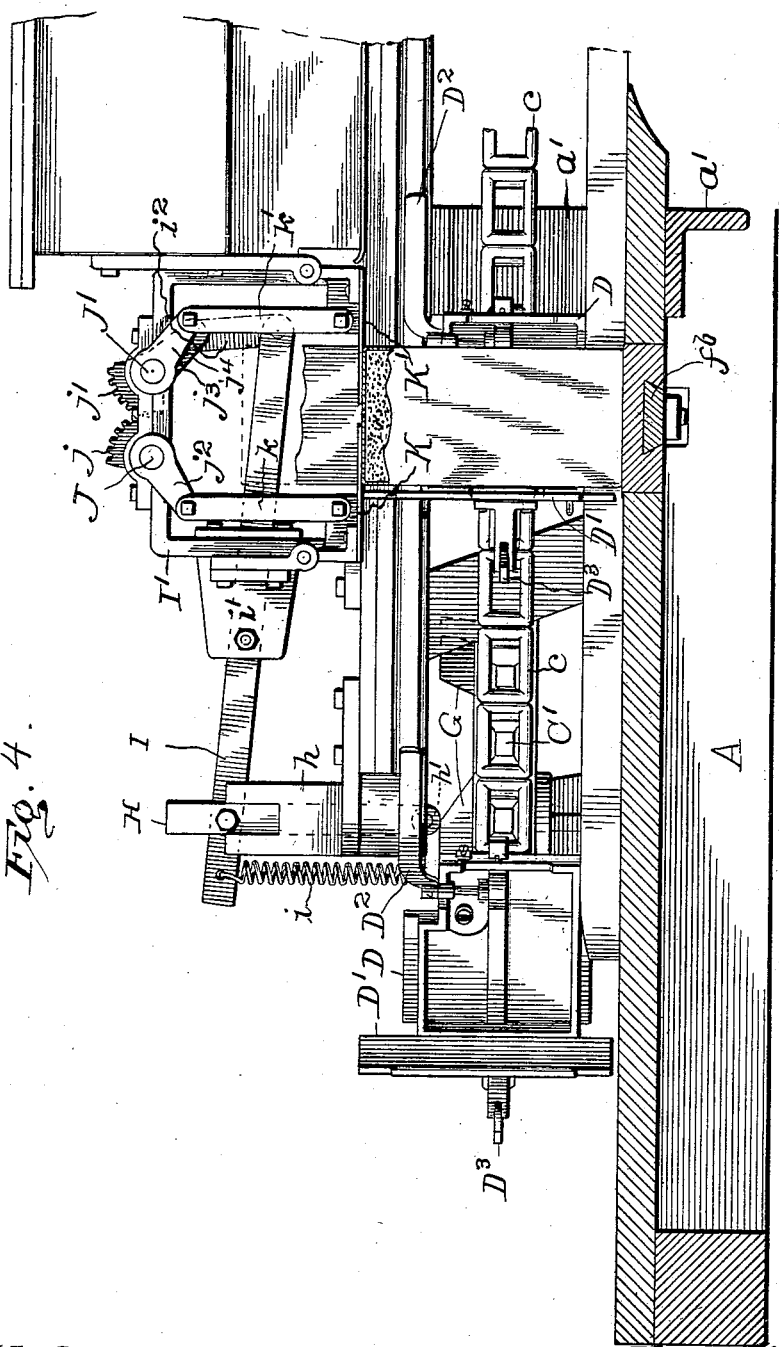

No. 733,510. PATENTED JULY 14, 1903.
C. REDD & G. H. CORMACK.
FLAP FOLDER FOR CARTON CLOSING MACHINES.
APPLICATION FILED JULY 1, 1902.
NO MODEL. 6 SHEETS—SHEET 6.
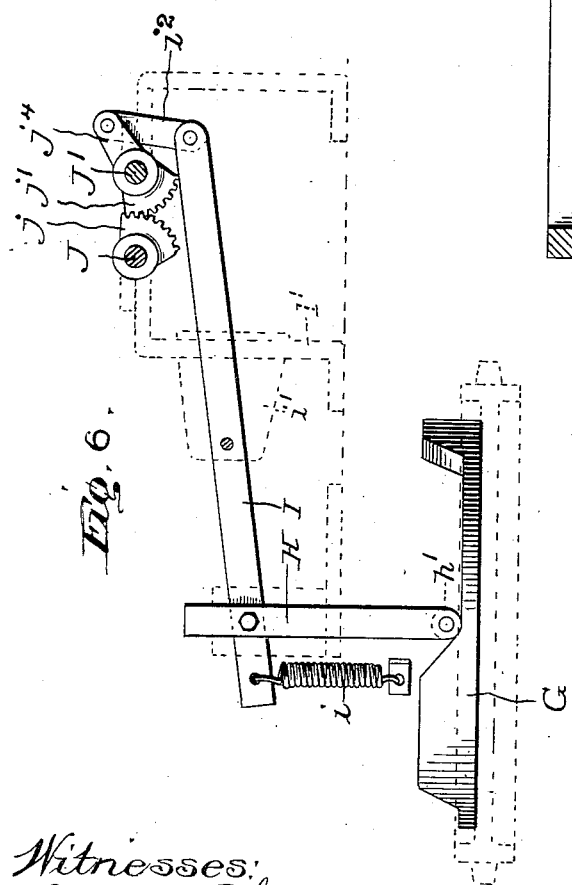
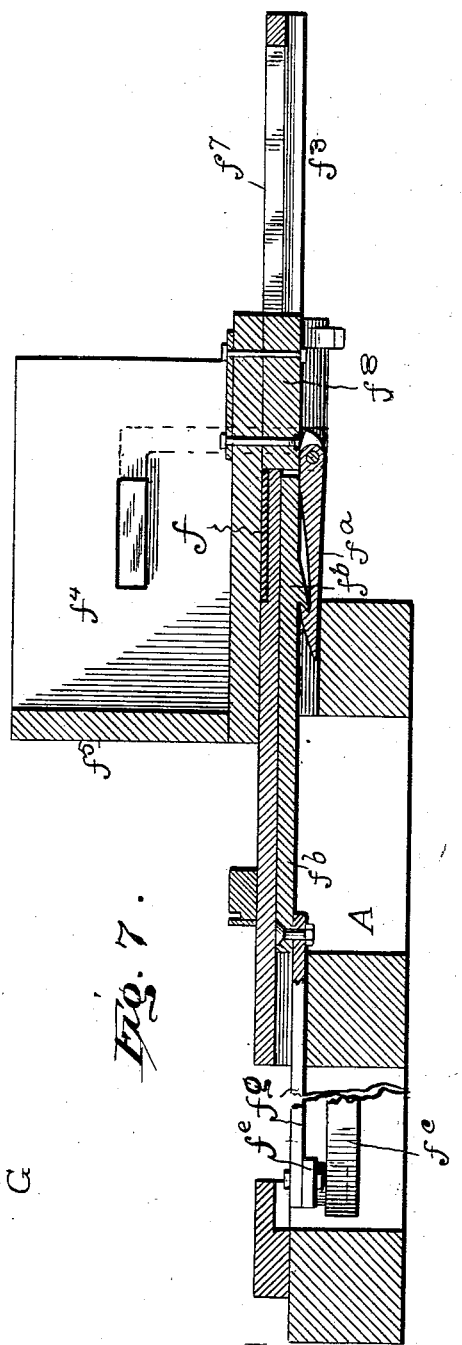

No. 733,510. Patented July 14, 1903.

UNITED STATES PATENT OFFICE.

CHARLIE REDD AND GEORGE H. CORMACK, OF ROCKFORD, ILLINOIS, ASSIGNORS, BY MESNE ASSIGNMENTS, TO ISAAC PIESER AND CHARLES G. LIVINGSTON, OF CHICAGO, ILLINOIS.

FLAP-FOLDER FOR CARTON-CLOSING MACHINES.

SPECIFICATION forming part of Letters Patent No. 733,510, dated July 14, 1903.

Application filed July 1, 1902. Serial No. 113,920. (No model.)

*To all whom it may concern:*

Be it known that we, CHARLIE REDD and GEORGE H. CORMACK, citizens of the United States of America, residing at Rockford, in the county of Winnebago and State of Illinois, have invented certain new and useful Improvements in Flap-Folders for Carton-Closing Machines, of which the following is a specification.

Our invention relates to certain new and useful improvements in flap-folders for carton-closing machines. Its object is to provide a folder for the side flaps of filled cartons, preferably for use in connection with a machine of the general type shown in applications made by us individually—to wit, application of Charlie Redd, filed February 7, 1901, Serial No. 46,319, and application of George H. Cormack, filed on even date with this application and allotted Serial No. 113,886. The flap-folder could doubtless be used in connection with other forms of carton-closing machines and also with machines for folding the bottoms of cartons; but it is intended primarily for use in connection with the machine heretofore referred to, and for this reason it is illustrated in connection therewith.

Our invention is fully set forth in this specification and it is illustrated in connection with a carton-closing machine in the accompanying drawings.

In the drawings, Figure 1 is a side elevation of the entire machine. Fig. 2 is a plan, the upper part of the machine, however, being removed to show the system of operating-gears employed. Fig. 3 is an enlarged detail section in the line 3 3 of Fig. 2, showing the flap-folder to which this invention particularly relates in side elevation and showing the parts before the folding operation takes place. Fig. 4 is a similar view showing the parts after the folding operation has taken place and the flaps have been folded into position. Fig. 5 is a detail plan of the same portion of the device. Fig. 6 is a diagrammatic view showing the folder-operating cam and the parts immediately actuated thereby; and Fig. 7 is a section in the line 7 7 of Fig. 2, showing the carton-feeding mechanism.

Referring to the drawings, A is the framework, shown as resting upon six legs $a$, secured together by the necessary longitudinal and transverse members to make a complete and substantial frame and to provide the necessary support for the various parts of the mechanism. On the frame A is supported a transverse driving-shaft B, carrying a driving-pulley $b$ and a loose pulley $b'$, adapted to receive a suitable belt, by means of which the machine may be driven. Between the opposite side pieces of the frame the shaft B carries a beveled pinion $b^2$, Fig. 2, in mesh with the beveled gear $b^3$ upon the vertical shaft B', also journaled in the frame. Upon the upper end of the shaft is a sprocket-wheel C, on which runs a conveyer-chain $c$, extending longitudinally of the machine and running over a similar sprocket-wheel C' at the other end, said sprocket-wheel being fast upon a vertical shaft B², also suitably journaled in the frame.

Along the conveyer-chain are secured a series of carton-holders, a detail description of which will be found in the application of George H. Cormack, filed on even date herewith and allotted Serial No. 113,886, reference to which has already been made. Without going into any lengthy description of this carton-holder, which is not an essential part of this invention, it will suffice to say that it consists of a frame D, a number of which are secured to the conveyer-chain at suitable intervals, this frame having a projecting vane D'. A carton-holding arm D² is pivoted in the frame and by a suitable system of gearing is connected with a lever D³, pivoted between its ends upon a bracket secured to the vane D'. The gearing is such that when the lever D³ is swung away from the vane the arm D² will swing up and hold the carton in place against the vane D'. This actuation of the arm D³ is employed by a suitable cam-surface in the path of the carton-holder, the location and operation of which will presently be described. Upon the frame of the machine are supported a series of trough-castings, one of which is shown at $a'$ in Fig. 4, and these castings support suitable guides to determine the path of the carton, and they form together substantially a trough through which the cartons pass. Above this trough are located the mechanisms which apply glue to the flaps of the cartons and which fold in the side flaps thereof. These different mechanisms are clearly and fully explained in the application of Redd, heretofore referred to, and as they are entirely separate from the features of this application they are not shown or described.

A main conveyer-belt E runs through the trough and supports the bottoms of the cartons. This belt travels at approximately the speed of the conveyer-chain and carton-holders, and its purpose is to avoid friction caused by the slipping of the carton-bottoms upon the bottom of the trough. This conveyer-belt is driven by a gear $e$ in mesh with a gear $e'$, driven by a suitable drive-chain and sprockets upon the shaft B.

A feed-trough F is supported at one end upon the framework of the machine and extends therefrom any desired distance to the point from which the packages are brought, said trough being of sufficient length to accommodate any accumulation of packages when the machine is being run to its fullest capacity. Along the bottom of this trough runs a traveling belt $f$, which passes over a loose pulley $f'$, Fig. 1, and is driven by any suitable means, the means employed in this machine being at the opposite end of the belt and not shown in the drawings. This belt is moved along the bottom of the trough in the direction shown by the arrow. At the end of the feed-trough nearest the transverse feed-chute F' is a laterally-projecting portion $f^3$, which contains a feed-slide $f^4$, the forward part $f^5$ of which pushes the packages laterally from the belt into the trough in which the folding and gluing of the end flaps is accomplished. Larger details of the feed-chute are shown in the Redd application, heretofore mentioned, and in Fig. 7 of this application. The laterally-projecting portion $f^3$ of the feed-chute contains a slot $f^7$, through which projects a block $f^8$, secured to the bottom of the feed-slide and having hinged to it a dog or hook $f^a$. The hook $f^a$ engages a hook upon a bar $f^b$, connected to a bar $f^g$, which is reciprocated by a lever $f^c$ and a suitably-grooved cam $f^e$, which is in turn rotated by a system of beveled gears, one of which is mounted upon the shaft $f^d$, said shaft being rotated by the pinion $b^3$. The arrangement of gears is such that the reciprocating hook-bar $f^b$ is reciprocated once before each carton-holder arrives opposite the feed-chute. To be more particular, in this case the plate, and consequently the feed-slide, is reciprocated three times for each revolution of the conveyer-sprockets C C'. There are in this particular machine three carton-holders for each length of the conveyer-chain equal to the circumference of these pulleys. By an arrangement which need not be here described and which is fully and completely explained in the application of Redd, heretofore referred to, the hook $f^a$ is released from engagement with the bar $f^b$ when there is no carton in place, so that there will be no reciprocation of the feed-slide. The only substantial difference between this device and the feed device shown by Redd is that we use at present a grooved cam which exerts a positive driving power at all times, while Redd used an outer surface-cam whose operation was counterbalanced by a suitable spring. It is to be understood that the carton is forced out from the feed-chute onto the main conveyer-belt immediately before its carton-holder reaches it. This will be clearly seen by reference to Fig. 3, wherein the carton is shown in position immediately upon being forced into the main conveyer-trough.

Coming now to the means for folding the front and rear flaps of the carton, which is the particular subject of this application, a cam G will be observed secured to the top of the conveyer-sprocket C'. The form of the cam-surface of this cam will be clearly understood on reference to Figs. 5 and 6. Upon this cam rests an arm H, guided in a suitable vertical guideway $h$, said arm having at its lower end an antifriction-roller $h'$. To the upper portion of this arm is pivoted a lever I, having attached to it a spring $i$, which normally holds the arm H in contact with the cam-surface. This lever I is pivoted between its ends upon a suitable bracket $i'$, supported upon a framework or casting I', which is immediately opposite the end of the feed-chute. In the top of this frame are two shafts J J', having upon them intermeshing segmental pinions $j\ j'$ and cranks $j^2$ and $j^3$. To the sides of the arch or casting I' are pivoted two folders K K' of the form shown in Figs. 3 and 4, and these folders are connected to the extremities of the cranks $j^2\ j^3$ by suitable links $k\ k'$. The end of the lever I is connected by a suitable link $i^2$ to a second crank $j^4$ upon the shaft J'. It will be observed that the connections herein shown are such that when the arm H rises up upon the cam-surface the crank $j^4$ will be drawn downward from the position shown in Fig. 3 to that shown in Fig. 4, thereby correspondingly rotating the pinions and lowering the links $k\ k'$. This of course brings the folders down upon the end of the cartons, thereby folding in the front and rear flaps. These flaps, it will be seen, are of just sufficient length to meet in the middle of the carton. In the meantime the carton-holder D has been constantly advancing from the position shown in Fig. 3 to that shown in Fig. 4, and at the moment when the folding of the flap is completed it comes in contact with the rear side of the carton and pushes it forward into the operating-trough, where the other flaps are glued and folded into place. Immediately upon entering this trough the lever $D^3$ of the carton-holder strikes a cam-surface L and swings the arm $D^2$ into contact with the carton, holding it firmly in place. The top of the carton passes under the top of the chute, and the front and rear flaps are held in place until the glue is applied and the closing of the carton is finished. This completes the description of the folder proper, which is the actual subject-matter of this invention. For this reason no further description will be made of the other parts of the machine which operate upon the carton after leaving our improved folding device. We have deemed it best to show the device and describe it in connection with a full-sized operative structure; but it will be observed that the main features are best shown in Figs. 3, 4, 5, and 6.

We realize that considerable variations can be made in the details of this construction, and we do not, therefore, desire to limit ourselves to the particular construction herein shown.

We claim as new and desire to secure by Letters Patent—

1. In a device of the class described, the combination with a series of vanes adapted to push a carton through a suitable operating-trough, of means for folding the top flaps of the cartons, and a suitable conveyer-belt adapted to receive the bottoms of the cartons when moved away from the folder by the vanes.

2. In a device of the class described, the combination with a series of vanes adapted to push a carton through a suitable operating-trough, and means for constantly advancing the vanes, of a folder adapted to close the carton and a belt moving at substantially the speed of the vanes and adapted to receive the bottom of the carton when moved away from the conveyer by the vanes.

3. In a device of the class described, the combination with a conveyer-chain and a series of vanes attached thereto and adapted to push a carton through an operating-trough, of means for folding the top flaps of the carton and a conveyer-belt moved at substantially the speed of the chain and parallel thereto and adapted to receive the bottom of the carton when moved away from the folder by the vanes, substantially as described.

4. In a device of the class described, the combination with a suitable arched frame adapted to receive cartons, of suitable folders pivotally connected to said frame and means for periodically bringing said folders down upon said cartons, substantially as described.

5. In a device of the class described, the combination with a suitable vane, and means for introducing cartons at stated intervals into the path of said vane, of suitable folders adapted to fold the front and rear flaps of said carton and means for operating said folder immediately after said carton is introduced into the path of said vane and before said vane reaches said carton, substantially as described.

6. In a device of the class described, the combination with a vane moving in a predetermined path, of a suitable feed-chute extending laterally in the path of said vane, means for periodically introducing a carton into the path of said vane, a suitable folding device over the path of said vane and in line with said chute, means for operating said folder immediately after the entrance of a carton from said feed-chute, and before said vane reaches said carton, substantially as described.

7. In a device of the class described, the combination with a suitable driving mechanism, of a vane operated by said driving mechanism, means operated by said driving mechanism for introducing a carton periodically into the path of said vane, a folder arranged in position to operate upon said carton immediately after its entrance to said path and automatic means for operating said folder immediately upon the entrance of said carton before the vane strikes the carton, substantially as described.

8. In a device of the class described, the combination with a series of vanes moving through a predetermined path, a feeding mechanism adapted to introduce cartons periodically into the path of said vanes and a suitable folding mechanism arranged to operate upon said cartons after their entrance to the path of said vanes, of means for operating said feeding and folding devices in the intervals between the passage of two adjacent vanes while the carton is stationary, past their position in the path of said vanes, substantially as described.

In witness whereof we have hereunto set our hands, at Rockford, in the county of Winnebago and State of Illinois, this 19th day of June, A. D. 1902.

CHARLIE REDD.
   GEORGE H. CORMACK.

Witnesses:
 ANDREW GILRUTH,
 F. E. DICKINSON.